C. F. MINNICK.
HEATING STOVE.
APPLICATION FILED JAN. 3, 1908.

901,985.

Patented Oct. 27, 1908.
2 SHEETS—SHEET 1.

Witnesses

Inventor
Charles F. Minnick.
By C. A. Snow & Co.
Attorneys

UNITED STATES PATENT OFFICE.

CHARLES F. MINNICK, OF NORTH POWDER, OREGON.

HEATING-STOVE.

No. 901,985.     Specification of Letters Patent.     Patented Oct. 27, 1908.

Application filed January 3, 1908. Serial No. 409,140.

*To all whom it may concern:*

Be it known that I, CHARLES F. MINNICK, a citizen of the United States, residing at North Powder, in the county of Union and State of Oregon, have invented a new and useful Heating-Stove, of which the following is a specification.

This invention relates to heating stoves and it is more particularly designed for using sawdust as a fuel.

The object of the invention is to provide a stove of this character having a magazine for holding sawdust, said magazine being readily accessible for the purpose of filling it and being provided with means whereby the sawdust can be fed onto the grate as rapidly as desired.

With these and other objects in view the invention consists of certain novel features of construction and combinations of parts which will be hereinafter more fully described and pointed out in the claims.

In the accompanying drawings is shown the preferred form of the invention.

Figure 1:
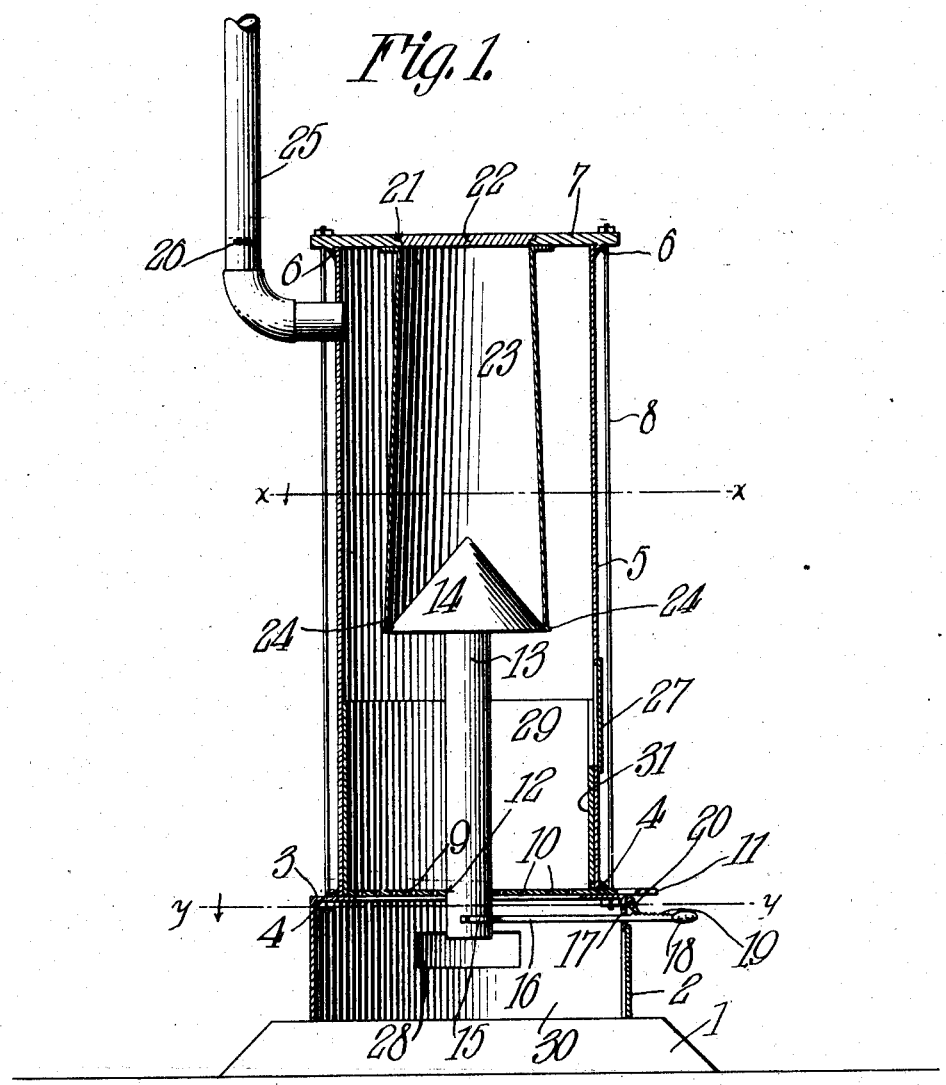
Figure 2:
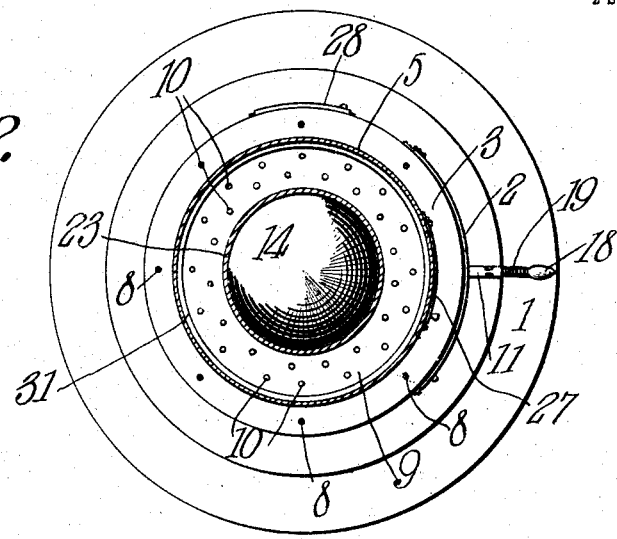
Figure 3:
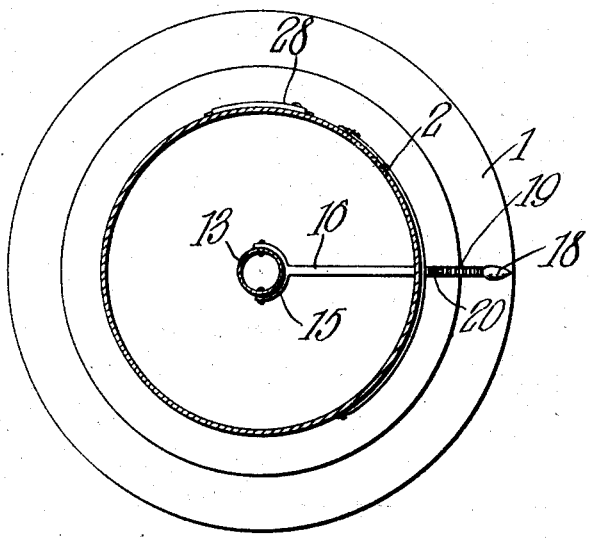

In said drawings: Figure 1 is a vertical section through a stove embodying the present improvements. Fig. 2 is a section on line x—x, Fig. 1. Fig. 3 is a section on line y—y, Fig. 1.

Referring to the figures by characters of reference, 1 designates the base of the stove, the same having an upstanding preferably cylindrical casing 2 constituting the ash box of the stove, the base and casing being preferably formed of cast metal, said casing being provided with an inwardly directed flange 3 at its upper end provided with a circular retaining rib 4 upon its upper face. This rib is adapted to surround the lower end of a cylindrical sheet metal casing 5 of any desired height, the upper end of which is surrounded by a circular bead 6 formed upon the lower face of the stove top 7. Bolts 8 extend longitudinally along the outer face of the casing 5 and are fastened to the top 7 and the flange 3 so as to bind said parts upon the ends of the casing 5 and form a rigid structure.

The grate of the stove consists of a metallic disk 9 provided with a plurality of apertures 10, said disk being preferably formed of a metal which is not easily affected by heat. An arm 11 extends radially from the plate 9 and through a slot in the stove casing 5 and constitutes means whereby the grate can be conveniently shaken. A large central orifice 12 is formed in the grate and slidably mounted therein is a tubular stem 13 carrying a conical head 14 at its upper end, said head constituting a valve as hereinafter stated. A yoke 15 is pivotally connected at that portion of the stem 13 within the ash box and an arm 16 extends from this yoke and through a slot 17 in casing 2. The projecting portion of this arm has a handle 18 and is provided with ratchet teeth 19 any one of which may be engaged by a pawl 20 pivoted upon the casing 2.

The stove top 7 has a central opening 21 designed to be closed by a removable lid 22 and secured to the lower surface of the top 7 and around the opening 21 is a magazine 23 preferably formed of sheet metal and which gradually tapers from its lower toward its upper end. The lower end of this magazine is slightly flared as at 24 and constitutes a seat for the head 14. A smoke pipe 25 extends from the upper portion of casing 5 and is provided with a suitable damper 26. Doors 27 and 28 constitute means whereby access may be conveniently had to the fire box and the ash box 30 respectively.

31 designates the lining of the fire box and which may be of any preferred material.

It is to be understood that the normal position of the head 14 is against its seat 24 the same being held in this position by pawl 20 which engages the nearest ratchet tooth 19. Lid 22 is removed and magazine 23 is filled with sawdust. After a fire has been started upon the grate 9 pawl 20 is raised so as to permit a desired upward movement of the outer end of arm 16, this movement causing a corresponding downward movement of head 14. The arm 16 can be held in any position to which it is moved by lowering pawl 20 into engagement therewith. Sawdust will feed by gravity downward around the head 14 and onto the grate and the fire will thus be constantly supplied with fuel. The products of combustion pass upward around the magazine and thence outward through pipe 25.

It has been found that a stove constructed and operated in the manner herein described constitutes an efficient heating medium and by providing a fuel feed such as described the operation of the stove from a single charge of fuel can be prolonged for a considerable period. The grate 9 coöperating with the yoke 15 constitutes efficient means for holding the stem 13 properly centered but it is of course to be understood that if desired any suitable additional means may be employed to hold the stem 13 in place. As this stem is formed of tubing it is possible for air to pass therethrough and the same is thus prevented from becoming burned by the heat generated within the fire box.

Although the connecting rods 8 have been shown extended along the outside of the casing it is to be understood that if preferred these rods can be placed inside of the casing where they will not be visible.

What is claimed is:

1. In a stove the combination with a casing and a grate therein; of a magazine supported above the grate, a combined closure and spreading means within the lower end of the magazine, and means entirely outside of the magazine for lowering said spreading means to release and spread the contents of the magazine upon the grate.

2. A stove comprising a casing, a grate therein, a magazine suspended within the casing and above the grate, a conical closure in the bottom of the magazine, a stem depending therefrom and guided by the grate, means for actuating the stem to shift the closure, and means for locking the closure in shifted position.

3. A stove comprising a casing, a grate therein, a magazine suspended within the casing and above the grate, said magazine having an open bottom and tapered toward its upper end, a closure for said upper end, a combined closure and spreading device for the lower end of the magazine, and separate means below the magazine for lowering and locking said device.

4. A stove comprising a casing, a grate therein, a magazine suspended within the casing and above the grate, said magazine having its lower end open and flared, a removable closure for the upper end of the magazine, a conical closure for the lower end thereof, a stem depending from said conical closure and guided within the grate, and means for actuating the stem to shift the closure.

5. A stove comprising a casing, a grate therein, a magazine suspended within the casing and above the grate, said magazine having its lower end open and flared, a removable closure for the upper end of the magazine, a conical closure for the lower end thereof, a stem depending from said conical closure and guided within the grate, an actuating arm pivotally connected to said stem, and means engaging the arm for locking it in adjusted position.

In testimony that I claim the foregoing as my own, I have hereto affixed my signature in the presence of two witnesses.

CHARLES F. MINNICK.

Witnesses:
  ED. J. JONES,
  S. M. MANN.